June 11, 1940. S. H. KRAMER 2,204,416
ANIMAL TOILET
Filed April 13, 1939
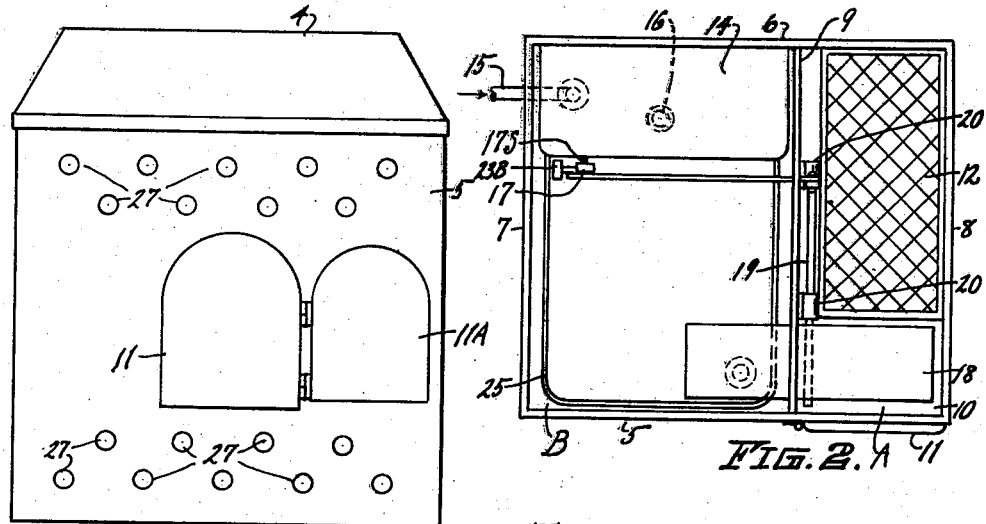
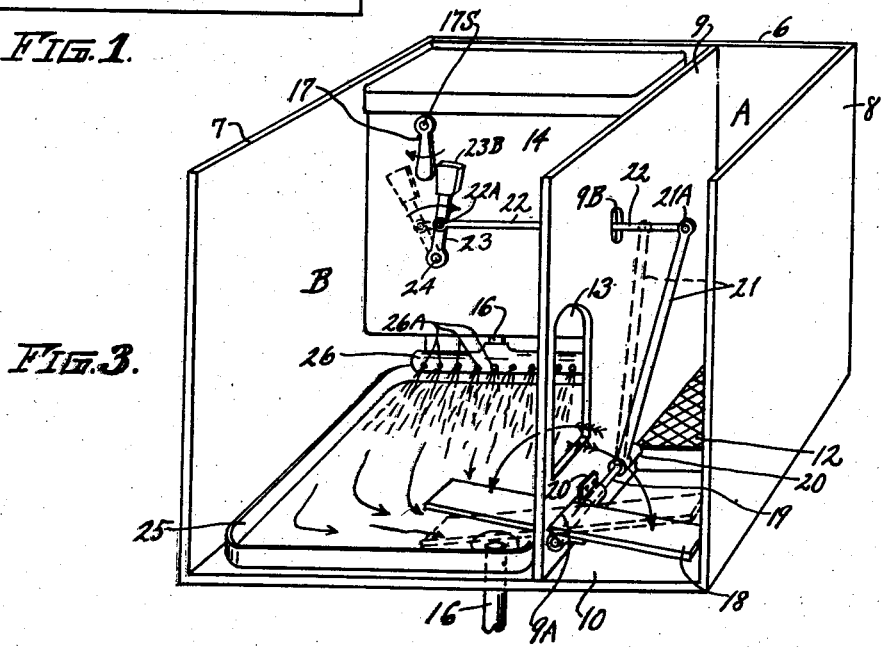
INVENTOR:
Sheridan H. Kramer
BY David E. Carlsen
ATTORNEY.

Patented June 11, 1940

2,204,416

UNITED STATES PATENT OFFICE 2,204,416

ANIMAL TOILET

Sheridan H. Kramer, St. Paul, Minn.

Application April 13, 1939, Serial No. 267,737

2 Claims. (Cl. 119—15)

This invention relates to an animal toilet designed particularly for the use of pet cats and dogs but adaptable undoubtedly for other animals.

The main object is to provide an efficient and sanitary toilet device which may be either fixed or portable but in any case must be connected with the plumbing in a building including the water line and a sewer outlet the former to flush out the excrement deposited by the animal confined in the device.

Among the advantages of this device its sanitary feature and its combination of provision for bed and toilet make this device desirable for tenants of flat and apartment buildings who own pet animals and which latter without this device in such building would be barred therefrom. Simplicity of construction and operation will be readily understood from the following specification, reference being had to the accompanying drawing, in which:

Fig. 1 is a front view of the device in slight perspective, and its entry door shown open. Fig. 2 is a top view of Fig. 1 with the cover of the device omitted and its entry door closed. Fig. 3 is a slightly enlarged perspective front view with the front wall of the device removed to reveal more clearly certain details of construction and use.

Referring to the drawing by reference numerals, like characters resignating corresponding parts in the various views, my device is illustrated in one form comprising a box-like housing with the top cover 4 either removable or hingedly attached. The housing comprises a front wall 5, rear wall 6, left wall 7, right wall 8, an interior partition 9, parallel to said latter walls 7—8, and floor or bottom 10.

11A is an aperture or doorway in the front wall, which may be closed by a door 11, said opening leading directly into compartment A between wall 8 and partition 9, in the rear part of which compartment is provided a bed 12. Compartment B is formed between the partition 9 and wall 7 and in said partition 9 is provided an aperture 13, at an elevation over the floor, for the animal to pass through.

In the rear part of compartment B, a regular so-called toilet flushing tank 14 is mounted on the rear wall and over the floor 10, said tank having the usual water intake pipe 15 and the water outlet pipe 16 (for flushing) said water intake and outlet controlled by means within the tank and actuated by the usual depending lever 17 exteriorly of the front of the tank and oscillatable on its pivot shaft 17S.

In this device the said lever 17 is operated by the weight of the animal in passing through from chamber A to B and vice versa, the latter movement of the animal actuating the lever 17 to release water for flushing purposes as will now be described.

18 is a tilter board, secured to a rock shaft 19 journaled in bearings 20 secured to lower part of partition 9 parallel to and slightly over the floor said board resembling a so-called teeter totter and being parallel to and just within the front wall of the housing and extending into chamber B through an aperture 9A in the partition.

21 is an upright lever secured to inner part of shaft 19 and normally in proximity to partition 9. At its upper end is pivotally connected as at 21A a reach rod 22 extending approximately horizontally through an aperture 9B thence parallel to, in front of tank 14 and its other end pivotally secured as at 22A to an actuating lever 23.

The lower end of said lever is pivotally retained on a steel shaft 24 projecting forward from the tank 14 and located directly below the flushing lever 17. The upper free end of the actuator 23 may comprise an enlargement of head 23B (of block) positioned so that when the lever is oscillated said head 23B will contact the lower part of lever 17 in its part. Movement to the left will cause head 23B to rock the lever 17 and will pass the latter to the position shown dotted in Fig. 3. Movement to the right as from dotted to full line position of lever 23 will cause contact with lever 17 and the latter releases a quantity of water from the tank expelled through pipe 16. This expelled water flushes a forwardly and downwardly inclined tray 25 fixed on and over the floor 10 in compartment B, there being a sewer outlet from tray 25 at the front right corner of the tray and the surface of the tray may be gently sloped in all directions to said outlet.

26 is a horizontally disposed pipe, parallel to and under the flushing tank and directly over the rear part of the tray 25, said pipe having direct T connection to the pipe 16 from the tank (see Fig. 3). In the forwardly exposed face or area of said pipe 26 is provided a row of apertures 26A providing a row of water jets which direct water down upon the tray in forward and downward direction to positively remove any and all animal excretion on the latter.

In the use of the device, it may first be assumed that a cat or dog has been put in the bed compartment A. At this time the right end of tilter board should be down. If and when the animal must use the toilet, it leaps through aperture 13 into the toilet compartment B coming down on the left half of the tilter board and pressing it down (as to dotted position in Fig. 3). This causes shaft 19 to rock slightly, lever 21 being positioned as shown dotted in Fig. 3 and lever 23 is positioned as shown dotted to the left of lever 17.

When the animal returns from chamber B to chamber A (through opening 13) its weight presses right side of the tilter board 18 down, oscillating lever 21 to full line position. The latter pulls rod 22 which actuates lever 23 to contact and move and pass flushing lever 17 to the right. Said movement of lever 17 releases water from the tank to provide flushing of the tray as previously described.

In the art it is well known that lever 17 may be moved (as to the left) without any mechanical or hydraulic action, but movement of it as to the right releases a quantity of water for flushing purposes. The means within tank 14 causing refill of water and valve controls for outlet of water etc., are well known and need not herein be specified in detail.

Outside of the box construction described, this device comprises only a few extra or specially designed parts, all simple and inexpensive. It has been found that pet cats and dogs readily adapt themselves to the device which has a duel service feature serving as sleeping quarters and toilet. Obviously to begin training an animal to use this device it may have to be locked in.

27 in Fig. 1 designates a series of air vents, provided in any suitable arrangement in one or more of the walls, for ventilation and to provide plenty of air for the animal. These vents are used if the device has sheet metal or wooden walls. The housing may of course be made with heavy screen or wire mesh walls and partition.

Other modifications may be embodied in the construction of the device without departing from the scope and spirit of my invention.

I claim:

1. An animal toilet comprising a box with a removable lid, a partition in said box providing adjoining chambers, one a bed chamber and the other a toilet chamber, a fixed tray in the latter chamber and water outlet means therefrom, a flushing tank in said chamber and valve means to release water therefrom to flush the tray, said partition provided with a passageway, a tilter board under said passageway and arranged to be tilted by the weight of an animal in passing from one chamber to the other, and means operable by the movement of said board in a predetermined direction to actuate said valve means and release a quantity of water directed onto said tray.

2. The structure specified in claim 1, in which said valve means of the flushing tank comprises in part an exposed, depending valve lever, a pivot-shaft for said tilt board, a lever on said shaft and a reach rod extending from said lever to the vicinity of said valve lever, means at the latter end of said reach rod to manipulate the said valve lever for said water releasing purpose, and an elongated water conductor under said flushing tank and provided with a row of water outlets directed downwardly toward the tray in the toilet chamber.

SHERIDAN H. KRAMER.